Jan. 10, 1933.    A. P. BALL    1,893,532
TRUCK BODY CONSTRUCTION
Filed Oct. 6, 1930    2 Sheets-Sheet 1
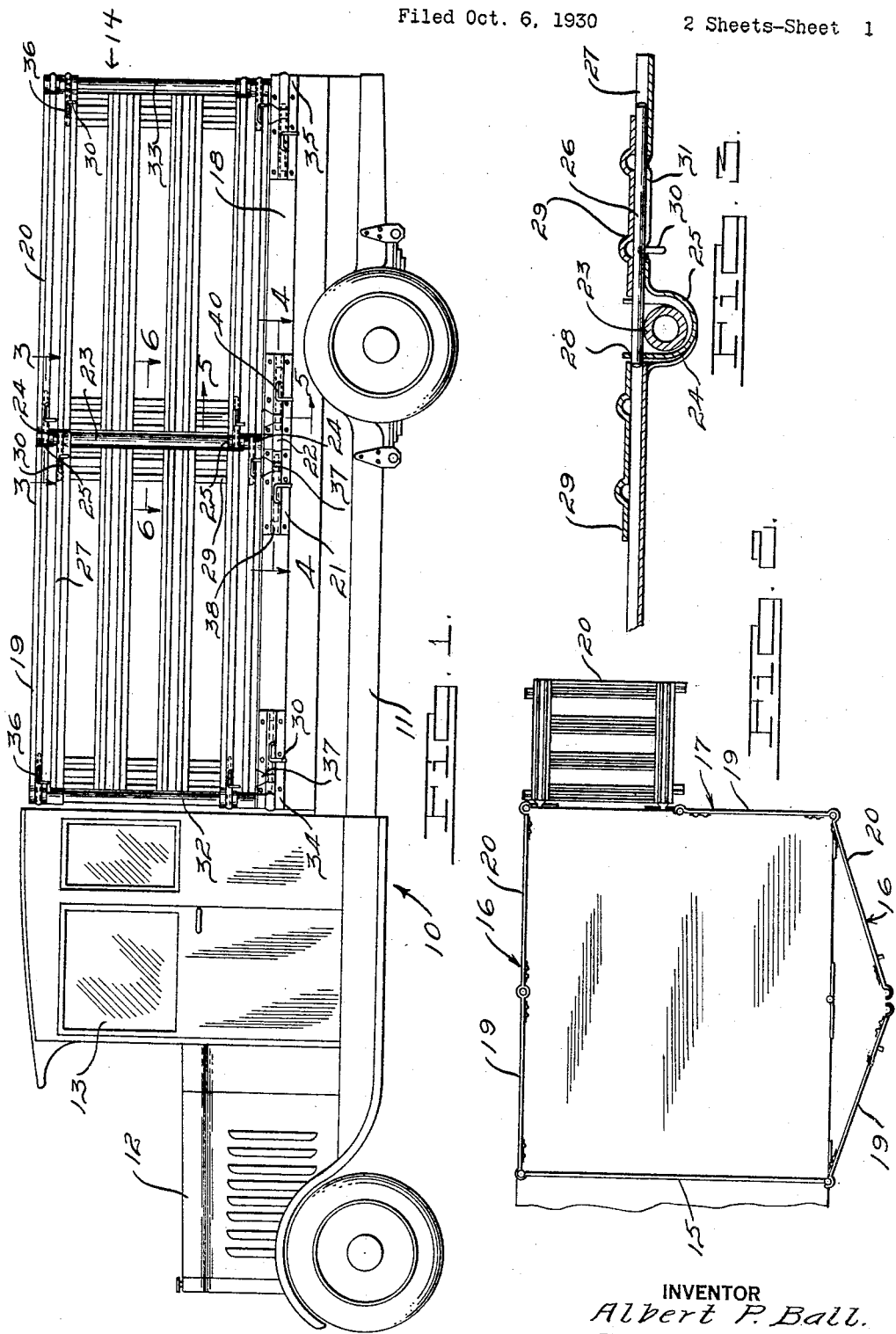
INVENTOR
Albert P. Ball.
BY
ATTORNEYS.

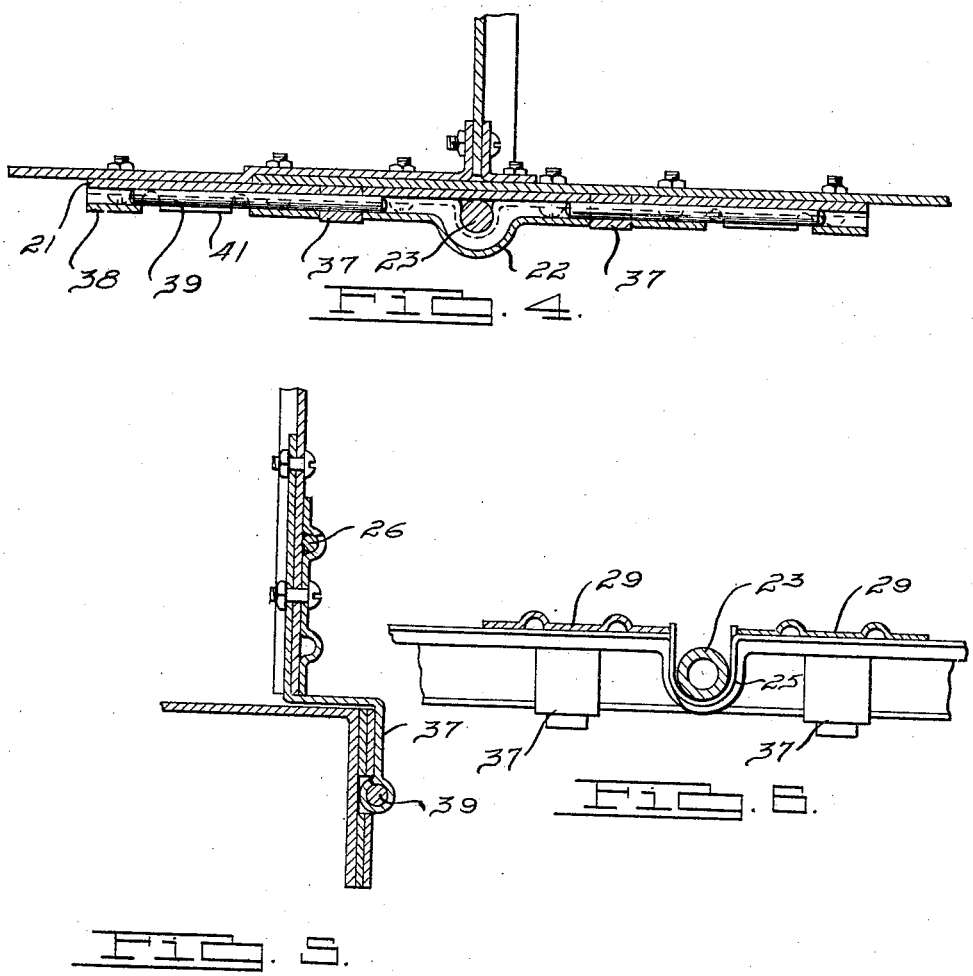

Patented Jan. 10, 1933

1,893,532

UNITED STATES PATENT OFFICE

ALBERT P. BALL, OF DETROIT, MICHIGAN, ASSIGNOR TO BRIGGS MANUFACTURING COMPANY, OF DETROIT, MICHIGAN, A CORPORATION OF MICHIGAN

TRUCK BODY CONSTRUCTION

Application filed October 6, 1930. Serial No. 486,825.

This invention relates generally to vehicle bodies and more particularly to improvements in the construction of truck bodies.

The present invention contemplates the provision of a truck body having a storage compartment provided with a side wall section having spaced edge portions detachably hingedly mounted upon the vehicle body together with means for readily releasing the pivotal connections between each of the edge portions and truck body. The construction is such as to permit swinging the section about any one of its pivotal edge portions by merely disconnecting the other pivotal edge portions from the body.

Another object of this invention is to provide a body construction for trucks and the like wherein the storage compartment is provided with a side wall formed of a plurality of sections hingedly mounted upon the body in such a manner as to permit each section to be swung to open or closed position about various side edges thereof independently of each other.

A further advantageous feature of this invention resides in the provision of a truck body of the type specified above wherein the hingedly connected side wall sections of the storage compartment may be readily removed from the body when desired. Thus, from the foregoing it will be apparent that loading and unloading of the storage compartment is not only facilitated due to the hingedly mounted side wall sections of the storage compartment, but more diversified use of the truck is afforded since the side walls may be readily removed and as a consequence, interchanged for walls of the desired design or if desired, the side walls may be eliminated entirely.

With the foregoing as well as other objects in view, the invention resides in the particular construction of the side walls of the storage compartment and the manner in which the same are pivotally mounted upon the truck body.

In the drawings:

Figure 1 is a side elevational view of a truck having a storage compartment assembled in accordance with this invention;

Figure 2 is a fragmentary top plan view of the construction illustrated in Figure 1 showing the manner in which certain of the side wall sections are swung to open position;

Figure 3 is a sectional view taken on the plane indicated by the line 3—3 of Figure 1;

Figure 4 is a sectional view taken on the line 4—4 of Figure 1;

Figure 5 is a sectional view taken on the line 5—5 of Figure 1; and

Figure 6 is a sectional view taken on the line 6—6 of Figure 1.

Referring now more in detail to the drawings, it will be noted that there is illustrated in Figure 1 a truck 10 having a chassis 11 of conventional design adapted to support a motor compartment 12 at the forward end thereof and a driver's compartment 13 in rear of the motor compartment. Positioned in rear of the driver's compartment 13 and supported upon the chassis frame in any suitable manner is the storage compartment 14. The storage compartment 14 preferably comprises the front, side and rear walls 15, 16 and 17, respectively, which may be either of solid construction or of the open work design depending upon the character of the load. In the present instance the walls are of the open work design, as shown in Figure 1, and extend upwardly from the platform 18 which forms the flooring for the storage compartment.

Each of the side and rear walls 16 and 17, respectively, are preferably formed of a plurality of sections 19 and 20 having their lower and side edges pivotally mounted upon the platform 18 in a manner to be presently described. In describing the particular manner illustrated herein in which the side and rear wall sections are pivotally mounted upon the body, reference will be made to only one side wall since the sections forming the opposite side wall and rear wall of the truck are preferably pivotally connected thereto and function in the same manner. Secured to the side of the platform 18 intermediate the ends thereof is a plate 21 having a centrally arranged outwardly bowed portion 22 cooperating with the side of the platform to form a pocket for receiving the upright stanchion 23 which is preferably circular in contour and forms a pivot pin for the adjacent edges of the sections 19 and 20. In this connection it is to be noted that the rear end of the section 19 is provided with rearwardly extending ears 24 for slidably receiving the stanchion 23, while the forward end of the section 20 is provided with similar ears 25 also slidably engaging the stanchion 23. As shown in Figure 3, the ears 24 and 25 do not encircle the stanchion 23, but on the other hand are so designed as to permit the sections 19 and 20 to be readily disengaged from the stanchion 23 by merely shifting the sections laterally outwardly relative to the stanchion.

In order to maintain the adjacent edges of the sections 19 and 20 in assembled relation with the stanchion 23 and at the same time to permit the sections to pivot about the stanchion 23, I provide latch members 26. As shown in Figure 3, the latch members 26 are in the form of bolts slidably mounted within reinforcing ribs 27 pressed outwardly from the sections 19 and 20 and extending longitudinally thereof. The bolts are arranged in alignment with the respective ears 24 and 25 and when in operative position as shown in Figure 3, extend across the entrance to the ears for preventing disengagement thereof from the stanchions 23. In detail, the bolts 26 extend across the ears through openings 28 in the free ends of the ears and project into the aligned reinforcing ribs of the adjacent wall section. The bolts 26 are held in assembled relation within the ribs 27 by means of the plates 29 which extend transversely of the walls across the ribs 27 and, in addition to serving the above purpose, also function to secure the bars forming the sections in spaced relation to each other. The bolts 26 are manipulated by means of handles 30 extending through elongated slots 31 in the ribs 27 and secured to the bolts 26. With the above construction, it will be seen that the adjacent edges of the sections 19 and 20 are not only detachably secured to the upright stanchion 23, but are permitted to pivot about the stanchion. In this connection it is to be noted that when it is desired to detach the adjacent edges of the sections 19 and 20 from the stanchion 23, the bolts 26 are merely moved outwardly by the handles 30 to disengage the same from the ears 24 and 25. When this is accomplished, the adjacent edges of the sections 19 and 20 may be readily moved outwardly from the stanchion 23.

The forward and rear ends of the sections 19 and 20 are pivotally connected to stanchions 32 and 33 in the same manner as the adjacent edges aforesaid are connected to the stanchion 23. The stanchions 32 and 33 extend upwardly from suitable pockets formed in the plates 34 and 35 which are secured to the platform 18 at the front and rear ends thereof, respectively. Both of the sections 19 and 20 are provided with cooperating aligned ears projecting forwardly and rearwardly from corresponding ends of the sections and adapted to receive the stanchions 32 and 33. The ears are normally held in assembled relation with the stanchions by means of the latch members 36 which are identical in construction to the latch members 26 hereinbefore described. In other words, the front and rear ends of the sections 19 and 20 are both detachably and pivotally mounted upon the stanchions 32 and 33. With the construction as thus far described, it will be noted that when it is desired to pivot the sections 19 and 20 about the central stanchion 23, the latch members 36 are manipulated to disengage the front and rear ends of the sections from the stanchions 32 and 33. On the other hand, when it is desired to swing the sections 19 and 20, respectively, about the stanchions 32 and 33, the latch members 26 are manipulated to disconnect the adjacent ends of the sections from engagement with the central stanchion 23. When pivoting the sections 19 and 20 about the stanchions 32 and 33, the central stanchion 23 may be readily removed from the platform 18, thereby exposing a substantial portion of the truck for loading or unloading purposes. In the illustrative embodiment of the invention, swinging of the side wall sections about their respective end stanchions permits swinging the entire end and opposite side walls of the storage compartment to open position since the said walls are each formed of but two sections. It is to be noted, however, that the construction is such as to permit opening only one side of the compartment or only a portion of one side since the sections forming the walls are hingedly mounted independent of each other.

In some uses of the truck it may be desirable to swing the sections 19 and 20 about the bottom edges thereof and in order to accomplish this result, each of the sections 19 and 20 are provided with downwardly extending ears 37 adjacent the front and rear ends thereof. The ears 37 project below the bottom edges of the sections 19 and 20 and are arranged within suitable slots formed in the plates 21, 34 and 35 with the openings therethrough in alignment with the longitudinally extending reinforcing ribs 38 pressed outwardly from each of the plates. The ears 37 are detachably and pivotally secured to the plates by means of the bolts 39 reciprocably mounted within the reinforcing ribs 38 and operable to extend through the ears as shown in Figure 4. The bolts 39 are adapted to be manipulated by means of suitable handle portions 40 secured to the bolts and extended outwardly through elongated slots 41 in the ribs.

Thus, from the foregoing it will be observed that the sections 19 and 20, in addition to being capable of pivoting about their opposite edges, are also capable of being pivoted about their lower edges. When it is desired to pivot the sections 19 and 20 about their lower edges, the latch members 26 and 36 are manipulated to disengage the upright edges of the sections from assembled relation with the stanchions 32 and 33. The pivotal connections between the lower edges of the sections 19 and 20 and the platform 18 does not affect pivoting the sections about the stanchions 32 and 33 since the ears 37 and bolts 39 cooperating to form the pivotal connection, may be readily disengaged when it is desired to pivot the sections about either of the aforesaid stanchions. It will further be understood from the preceding description that the sections 19 and 20 are so pivotally mounted upon the truck for swinging movement relative to the latter that each individual section may be swung about any one of its pivotally connected edges independent of the other sections.

While in describing the invention particular stress has been placed upon the provision of a storage compartment wherein the opposite side and rear walls are formed of hingedly mounted removable sections, it is to be understood that only one of the walls or a portion of the same may be hingedly and removably connected to the body, as specified above, without departing from the spirit and scope of this invention and accordingly reservation is made to make such changes as may come within the purview of the accompanying claims.

What I claim as my invention is:

1. A truck body having a storage compartment provided with a side wall formed of a plurality of sections, and detachable means independently hingedly connecting spaced vertical side edges of each of said sections to stanchions carried by the body permitting said sections to selectively swing independently of each other about each of said vertical side edges.

2. A truck body having a storage compartment provided with a sectional side wall comprising a pair of sections having the adjacent edges detachably connected together by means constituting hinges for each section, and means for detachably securing the opposite edges of each section to stanchions carried by the truck body by means constituting hinges.

3. A truck body having a storage compartment comprising longitudinally spaced upright members mounted upon a part of the truck body, a side wall for the storage compartment having opposite side edges detachably secured to the upright members by means constituting hinges, and detachable means hingedly connecting another side edge of said wall to the truck body.

4. A truck body having a storage compartment comprising longitudinally spaced upright members readily detachably mounted upon a part of the truck body, wall sections interposed between the members and having their vertical side edge portions detachably connected to the upright members by means constituting hinges and detachable hinge connections between the lower edge portions of said sections and truck body.

5. A truck body having a storage compartment provided with a sectional side wall including a pair of sections, a stanchion located between the adjacent vertical edges of said sections, readily detachable means constituting hinges for securing the said side edges of said sections to said stanchion, and readily detachable means constituting hinges for securing the opposite vertical side edges of said sections to other stanchions carried by said body.

6. A truck body having a storage compartment provided with a sectional side wall including a pair of sections, a stanchion located between the adjacent vertical side edges of said sections, means for detachably connecting said stanchions to said body, readily detachable means constituting hinges for securing the said side edges of said sections to said stanchion, readily detachable means constituting hinges for securing the opposite vertical side edges of other stanchions carried by said sections to said body, and readily detachable means constituting hinges for securing the lower edge of each section to said body.

In testimony whereof I affix my signature.

ALBERT P. BALL.